(No Model.)

J. LEGAY & L. LEGAY, FILS.
ELECTRODE FOR SECONDARY BATTERIES.

No. 514,267. Patented Feb. 6, 1894.

UNITED STATES PATENT OFFICE.

JULES LEGAY AND LUCIEN LEGAY, FILS, OF LEVALLOIS, FRANCE.

ELECTRODE FOR SECONDARY BATTERIES.

SPECIFICATION forming part of Letters Patent No. 514,267, dated February 6, 1894.

Application filed October 13, 1890. Serial No. 367,946. (No model.) Patented in France July 25, 1890, No. 207,211; in Belgium July 28, 1890, No. 91,411; in England July 30, 1890, No. 11,919; in Switzerland October 15, 1890, No. 2,903; in Italy January 22, 1891, XXV, 28,980, LVII, 112, and in Germany March 24, 1891, No. 60,840.

*To all whom it may concern:*

Be it known that we, JULES LEGAY and LUCIEN LEGAY, Fils, electricians, residents of Levallois, Department of the Seine, in the Republic of France, have invented certain new and useful Improvements in Electrodes for Secondary Batteries, (for which patents have been granted in France July 25, 1890, No. 207,211; in Belgium July 28, 1890, No. 91,411; in Germany March 24, 1891, No. 60,840; in Great Britain July 30, 1890, No. 11,919; in Switzerland October 15, 1890, No. 2,903, and in Italy January 22, 1891, No. 28,980/112, Vol. XXV/LVII;) and we declare the following to be a full, clear, and exact description of the same.

Our invention relates to electrodes for secondary batteries and the object is to produce a simple and inexpensive electrode which will present a maximum active surface.

Figure 1:
Figure 2:
Figure 3:
Figure 4:
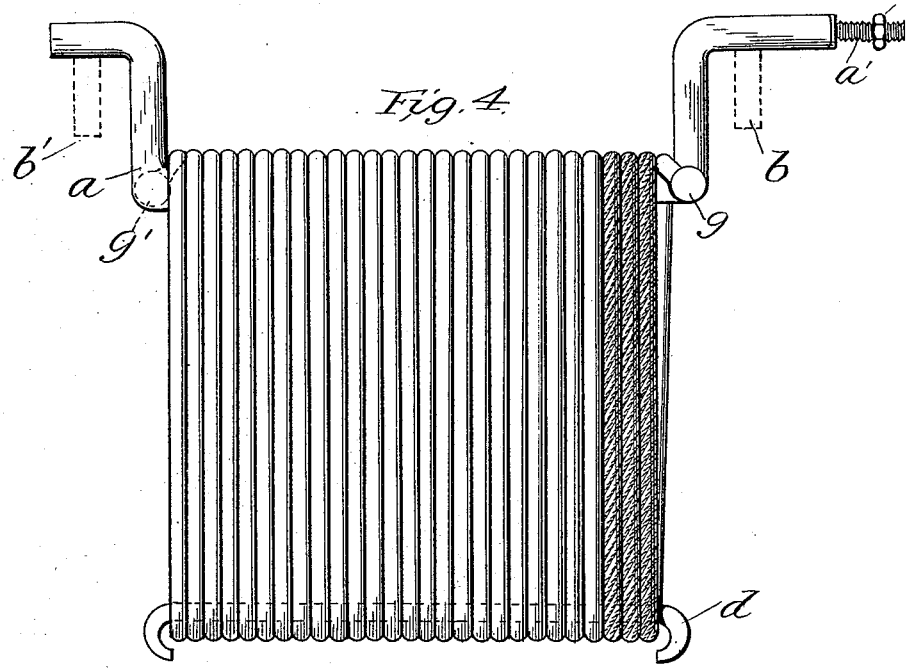

In the drawings: Figure 1, is a view of one of the twisted strands comprising our improved electrode. Fig. 2, is a view of a cable formed of said strands. Fig. 3, shows a cable composed of oppositely twisted strands. Fig. 4, is a side view of the complete electrode and Fig. 5, is a plan view of the same.

In forming our electrode we take wires or strips of lead of square or other cross sectional shape and twist them spirally as shown in Fig. 1. A number of these wires are then assembled to constitute the active surface for the secondary battery electrode, and when so assembled a great number of recesses or interstices are formed between the twisted portions of the wires through which the liquid and gases can freely circulate to contact with the surface of the wires thus practically the whole surface of the wire is rendered active while the electrode may be made in compact form and is of comparatively light weight.

The wires may be assembled in various ways but we prefer to assemble them into the form of a cable as shown in Figs. 2, 3, 4 and 5 by twisting them together. The cables may be formed by twisting together wires which have all been twisted in the same direction as in Fig. 2 or twisting together wires whose spirals run in opposite directions, as in Fig. 3. In both forms the recesses or interstices are formed and the active surface is great as compared with a cable formed by plain untwisted wires.

Figure 5:

In Figs. 4 and 5 we show the manner of mounting the cable to form the complete electrode. This consisting in wrapping the cable about the cross piece $a$ and letting the loops of the cable depend therefrom equally from side to side.

The ends $g$, $g'$ are soldered or otherwise secured to the cross piece $a$ as shown and the cross piece is of such angular shape as to adapt it to being placed on the sides or brackets $b$, $b'$ of the battery tank or case. The cross piece has a threaded end $a'$ having thereon a nut $c^2$ of ebonite or other insulating material by which suitable connections may be made with the circuit. The loops of the cable are held together at their lower ends by the cross bar $d$ which is threaded through them having hooked ends to engage the outer loops to retain them all against lateral play or displacement. In the drawings we have shown only a few of the loops as formed of twisted wire this being sufficient for the purpose, it being understood that the cable is the same throughout.

We claim as our invention—

1. An electrode for batteries composed of spirally twisted wires twisted together in the form of a cable, substantially as described.

2. An electrode for batteries composed of spirally twisted wires twisted together in the form of a continuous cable which is looped about a cross bar $a$ to depend therefrom, substantially as described.

3. An electrode comprising a cable, the strands of which are spirally twisted in opposite directions throughout their length, substantially as described.

4. An electrode comprising a cable, the cross rod $a$ about which the cable is looped and the retaining rod passing through the lower ends of the loops, substantially as described.

In witness whereof we have hereunto set our hands in presence of two witnesses.

JULES LEGAY.
LUCIEN LEGAY, FILS.

Witnesses:
ALPHONSE BLÉTRY,
ALEXANDRE HUBAUT.